United States Patent [19]

Lagache

[11] Patent Number: 5,148,681
[45] Date of Patent: Sep. 22, 1992

[54] PASSIVE EMERGENCY VENTILATION SYSTEM

[75] Inventor: Michel P. Lagache, Orinda, Calif.

[73] Assignee: Bechtel Group, Inc., San Francisco, Calif.

[21] Appl. No.: 551,698

[22] Filed: Jul. 11, 1990

Related U.S. Application Data

[63] Continuation-in-part of Ser. No. 490,183, Mar. 8, 1990, abandoned.

[51] Int. Cl.$^5$ .................................................. F25J 3/04
[52] U.S. Cl. ........................................ 62/48.1; 62/50.2; 62/259.1
[58] Field of Search ............... 62/48.1, 50.2, 78, 259.1

[56] References Cited

U.S. PATENT DOCUMENTS

| | | | |
|---|---|---|---|
| 2,089,428 | 8/1937 | Ross et al. | 62/50.2 X |
| 2,158,458 | 5/1939 | Mathis et al. | 62/48.1 X |
| 2,990,695 | 7/1961 | Leffingwell, Jr. | 62/50.2 X |
| 3,062,017 | 11/1962 | Balcar et al. | 62/48.1 |
| 3,318,307 | 5/1967 | Nicastro | 62/50.2 X |
| 3,831,594 | 8/1974 | Rein | 62/48.1 X |
| 4,337,071 | 6/1982 | Yang | 62/78 |

FOREIGN PATENT DOCUMENTS

| | | | |
|---|---|---|---|
| 2648633 | 5/1978 | Fed. Rep. of Germany | 62/50.2 |
| 46436 | 3/1984 | Japan | 98/32 |

OTHER PUBLICATIONS

Carrier advertising materials, "Carrier Water Control Weathermaster Induction Air Terminals," Jun. 1975.
Lagache et al., "Simplified Decay Heat Rejection Concept for BWR Plants," Preprint of ASME Paper Presented at the Jul. 1989 PVP Conference, Honolulu, Hi., pp. 1-6.

Primary Examiner—Harold Joyce
Attorney, Agent, or Firm—Townsend and Townsend

[57] ABSTRACT

A passive emergency ventilation system and method. The system includes a storage facility for a substantial volume of compressed or preferably liquified air in or near a room to be ventilated. During an emergency event, air from the storage facility is gasified in a liquid air gasifier and flows through one or more eductors. The eductors are used to draw additional ambient air into the system. The ambient air may optionally be cooled through one or both of mixing with the incoming stored air and/or using the incoming ambient air to heat liquid air gasifiers.

23 Claims, 2 Drawing Sheets

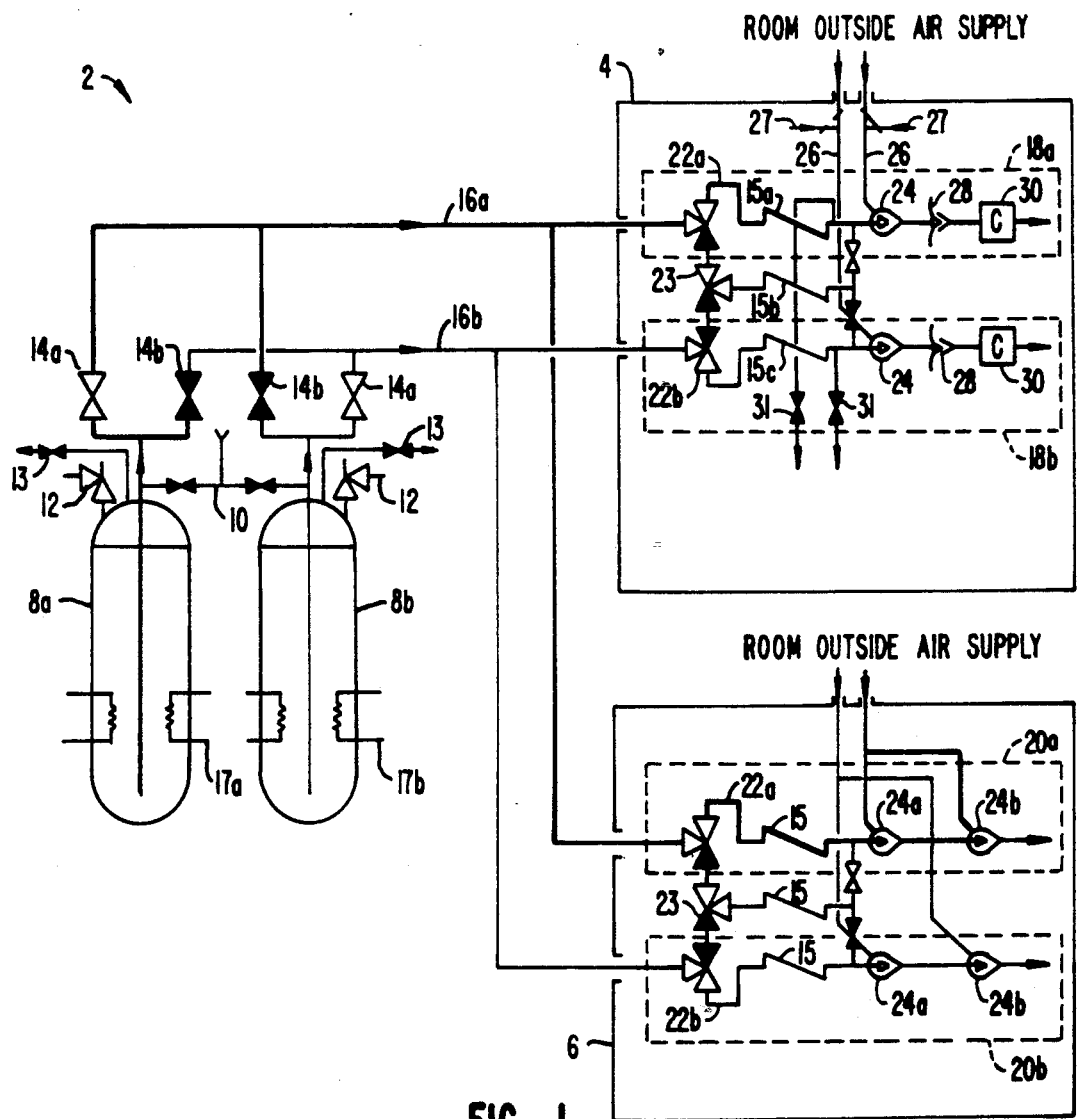
FIG._1.
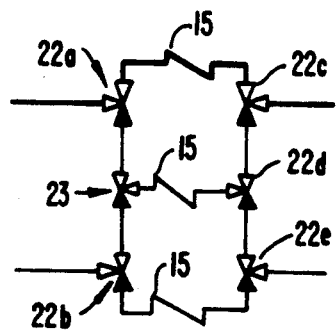
FIG._2.

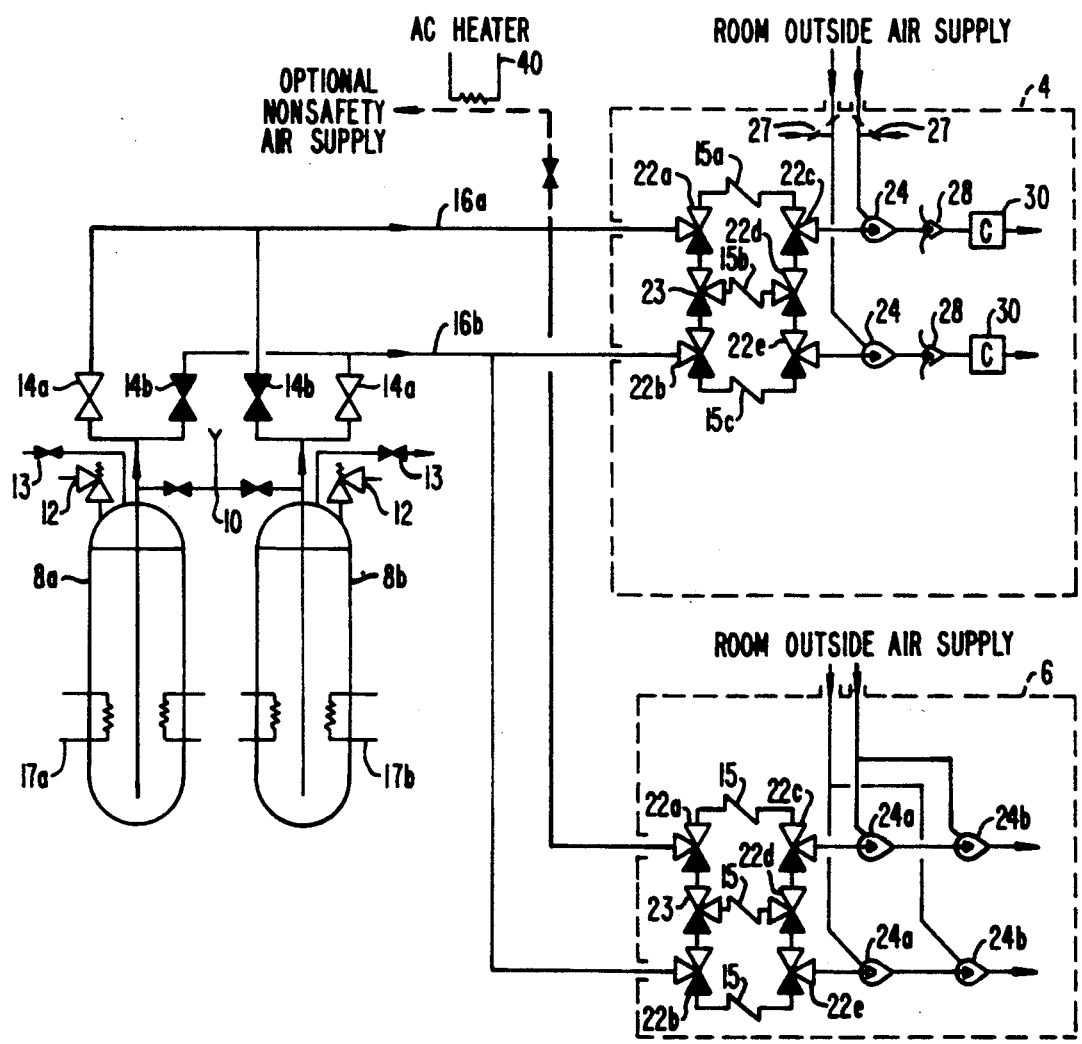
FIG._3.

PASSIVE EMERGENCY VENTILATION SYSTEM

CROSS-REFERENCE TO RELATED APPLICATIONS

This is a continuation-in-part of U.S. application Ser. No. 490,183, filed Mar. 8, 1990, abandoned which is incorporated herein by reference.

BACKGROUND OF THE INVENTION

The present invention relates to the field of ambient air supply systems. More specifically, in one embodiment the invention provides a post accident ventilation system and method for supplying breathable and cooled air to a portion of a facility such as a factory, chemical plant, refinery, or power plant in an emergency situation.

In the design of many industrial facilities it is necessary to consider and design for a variety of accidents which might occur. For example, in the design of a chemical plant, refinery, or nuclear power plant it is necessary to consider a variety of emergency situations which might unfortunately arise during the operation of such facilities which could lead to the release of undesirable or hazardous materials to the environment. During such emergency situations it is desirable to provide breathable air to certain portions of the facility such that human life can continue to be supported in these portions of the facility. For example, it is often desirable to continue to provide breathable air to the control room of such facilities so as to permit operators to both seek refuge in the control room and remain in the control room to stop or limit the situation which has given rise to the emergency situation.

A variety of techniques have been proposed for supplying emergency air to rooms within such facilities. For example, some systems utilize clean air that is stored onsite in high pressure storage tanks. Other systems process ambient air through filters. Air cooling using icebeds is a well known technique to cool ambient air.

While meeting with some success, the above systems have a variety of limitations. For example, some of the above systems rely on electrical, mechanical, or other devices which may be rendered inoperative during an emergency situation. Some systems provide for clean air, but the temperature of the air cannot be easily modified. Some systems provide for air cooling but not for providing clean air.

From the above it is seen that an improved method and apparatus for providing emergency ventilation to selected rooms in an industrial or other facility are desired.

SUMMARY OF THE INVENTION

An improved emergency ventilation system is disclosed. The system is largely passive in the sense that little or no mechanical, electrical or electromechanical input is required to operate the system. The ventilation system will find application in a variety of industries. For example, the ventilation system may be used to ventilate rooms in chemical plants, refineries, nuclear power plants, waste processing facilities and the like. A variety of additional applications will become apparent to those of skill in the art upon review of this disclosure.

The invention provides for the storage of a substantial volume of compressed or, preferably, liquified air at a storage facility in or near a room to be ventilated. During an emergency event, air from the storage facility is warmed in a heat exchanger and flows through one or more eductors. The eductors are used to draw ambient air into the system from, for example, an outside ambient source. The ambient air may optionally be cleaned by a purification unit and cooled through mixing with the incoming stored air and/or flowing through the heat exchanger. The system and method provides fresh air, and purified and cooled recycled air while at the same time using largely passive components. Furthermore, the system requires little in the way of support facilities or space and uses components which present little danger to users.

Accordingly, one embodiment of the invention provides a method for emergency ventilation of a control room in a nuclear power plant comprising the steps of flowing liquid air from at least one of two storage tanks into the control room; selectively controlling flow in an alternating manner from the storage tanks into heat exchangers in the control room; flowing the air through at least one heat exchanger and one eductor, the eductor drawing ambient air into a flow of air from the storage tank; and flowing air from the eductor into the control room through purification units.

According to one aspect of the invention in apparatus form, the invention includes an air storage tank; a flow line from the liquid air storage tank to a room to be ventilated; a valve in the flow line for providing a flow of liquid from the tank during an emergency event; a heat exchanger downstream of the valve; and an eductor in the flow line downstream of the heat exchanger, the eductor further connected to an ambient air supply line, the ambient air supply line terminating at an ambient air source outside of the room, and the eductor discharging into the selected room through air cleaning units.

A further understanding of the nature and advantages of the inventions herein may be realized by reference to the remaining portions of the specification and the attached drawings.

BRIEF DESCRIPTION OF THE DRAWINGS

FIG. 1 is a process flow diagram illustrating the major components of the system disclosed herein;

FIG. 2 is a diagram of an alternative preferred embodiment of a valve system for controlling flow through the heat exchangers; and FIG. 3 is a diagram of an alternative preferred embodiment of the system that also provides for supplying clean compressed air to the facility auxilliary services during selected non-emergency situations.

DESCRIPTION OF THE PREFERRED EMBODIMENTS

CONTENTS

I. General
II. Description of the PEVS Hardware
III. PEVS Operation
IV. Conclusion

I. General

In designing emergency equipment for facilities potentially exposed to hazardous environments it is desirable to provide emergency equipment which is largely or entirely passive, i.e., which requires little or no mechanical or electrical input to function. Nuclear power plants are exemplary of facilities in which it is desired to provide passive emergency facilities.

Various simplified nuclear plant designs have been and are currently being developed such that reactor safety is ensured by only passive or nearly passive means for all potential events of significant probability, including all licensing basis events (i.e., all events required to be mitigated for licensing). One such group of plants consists of the Simplified Advanced Light Water Reactors (S/ALWRs) and includes the Westinghouse AP-600 and General Electric SBWR.

One challenge in these "simplified" designs is to provide for the post accident ventilation needs of the plant using only passive systems that can operate for a significant length of time. The basic function of any ventilation system is to maintain ambient air conditions within acceptable limits. In a nuclear plant, post accident ventilation is required mainly for the purposes of maintaining ambient air at a moderate temperature, and free of hazardous contaminants.

The Passive Emergency Ventilation System (PEVS) provided herein utilizes liquified air stored at moderate pressure in combination with one or more noncritical jet air eductors to passively move ambient air in a desired region of a facility. The liquified air is clean, cool, and provides a motive fluid for secondary air movement. Noncritical jet air eductors (in single or multiple stages) passively move ambient air using relatively small amounts of motive liquified air. It is to be understood that the term eductor is intended to mean devices which are often referred to by those of skill in the art as inductors, ejectors, jet pumps, and the like.

According to preferred embodiments, the system includes enough redundancy to protect against all likely component failures. The system is entirely "moderate energy" by NRC standards (temperature below 200° F., pressure below 275 psig) and not susceptible to gross failures. During normal plant operation, the system is always on stand-by with all process valves open, except for the inlet valves. The storage tanks are kept at stand-by pressure by vent/relief valves.

To place the system in operation, process inlet valves are opened and small tank heaters are energized by the plant safety related batteries. As the inlet valves open, liquid air is forced through ambient air coolers and, thereafter, into eductors, where it induces secondary air flow and purification.

II. Description of the PEVS Hardware

FIG. 1 illustrates one embodiment of the PEVS system 2. The system illustrated in FIG. 1 is utilized to provide emergency air to a first room 4 and a second room 6. The first room 4 may be, for example, a control room of a nuclear plant, while the second room may be a battery room or other room where it is desired to provide emergency ventilation. It will be recognized by those of skill in the art that while the invention is illustrated herein as it is applied to provide ventilation in two rooms, the invention is not so limited and could be utilized to supply emergency air to any number of rooms.

In the embodiment shown in FIG. 1 the system is used to pressurize and cool the room 4 and maintain air purity by filtration and selectively using either a combination of room inside and outside air, or inside air only. In the room 6, the system is used for cooling, and for diluting, for example, hydrogen below the level at which a fire or explosion could occur. Other plant areas may call for other combinations of cooling and filtration duties and, thus, different PEVS flow configurations which will be apparent to those of skill in the art.

The system 2 stores air in liquid form in storage tanks 8a and 8b. By "air" it is intended to mean herein a mixture of gasses having approximately the composition of ambient air (about 80% $N_2$ and about 20% $O_2$), although it will be apparent to those of skill in the art that the invention could be used with a wide range of gas source compositions. Preferably, the air is stored at moderate pressure (i.e., between about 20 and 150 psig, and preferably about 50 psig). Thus, it avoids introducing a major new hazard (tank explosion), minimizes direct storage costs and related building costs, and avoids the need for a special compressor or very high pressure air supplies. Of course, the size of the air tanks will vary widely from one application to another. According to some embodiments, the tanks have a capacity of between about 100 and 1000 $ft^3$. Preferably, the air tanks are located at nearly the same elevation as the control room to reduce pressure head losses from the tanks to the rooms.

The tanks are provided with a fill line and control valve 10. The fill valve is normally closed, and is opened only to input liquified air from an associated supply unit or truck (not shown). Each tank is also provided with a pressure vent/relief valve 12 which provides for the pressurized tank venting and eliminates explosion hazards from any potential overpressure situation caused by, for example, excessive heating of the tanks. Depressurization vent lines/valves 13 are used to provide reduced pressure in the tanks for filling operations.

The tanks 8a and 8b are provided with heaters 17a and 17b, respectively. According to one embodiment heaters 17a and 17b are electric heaters connected to an emergency battery back-up electrical system in the plant, although it will be apparent to those of skill in the art that other sources of heat may be utilized such as a heat pipe to ambient air. According to preferred embodiments the heaters 17a and 17b are designed to provide heat input of between about 50 watts and 1 kilowatt to each tank.

Tanks 8a and 8b will generally be insulated to reduce evaporative losses during standby operations. Heaters 17a and 17b will be required to boil liquid air from the tanks in these embodiments. Heaters 17a and 17b may, therefore, be used to regulate the flow of air by way of control of the DC current flow to the heaters, eliminating the need for precise mechanical flow control valves.

Each tank is provided with a set of two outlet lines/valves 14a and 14b which draw from the bottom of the tanks so as to ensure liquid output. The outlet valves are connected to flow lines 16a and 16b which each lead into both of rooms 4 and 6, respectively. Flow line 16a is connected to eductor system 18a in control room 4 and eductor system 20a in battery room 6. Flow line 16b is connected to eductor system 18b in control room 4 and system 20b in battery room 6. Valves 14a and 14b permit the tanks to be controlled such that each tank may provide input to either or both eductor system.

Each eductor system 18a includes three-way (or two one-way) valves 22a and 22b which are used to selectively provide liquid air flow to the heat exchangers 15 during emergencies and to alternate the flow of air between the heat exchangers during operation. Vaporization of the liquid air will occur in heat exchangers 15 by way of heat transfer from the surrounding room air, or mechanical or electrical equipment in the room. Valve 23 is connected to control air to a spare heat exchanger from either tank.

Since liquid air has a very low boiling temperature, portions of the system such as ambient air coolers 15 will build up ice deposits on their exterior during operations. Thus, according to preferred embodiments, air coolers are provided with about 100% excess heat transfer surface. According to preferred embodiments, the air coolers have a surface area of between about 10 and 1000 square feet. Three ambient air coolers are provided such that the coolers may be operated on an alternating basis and be provided with spare capacity. This permits periodic de-icing of the coolers by alternately returning them to ambient temperature.

The outlet of the heat exchanger 15 is connected to eductors 24. Eductors 24 are also connected to ambient air inlet lines 26. Ambient air inlet lines 26 may draw air from a location outside of the room or from inside the room by way of dampers 27. Air may be provided from a wide variety of sources without departing from the scope of the invention.

Eductors 24 are preferably designed to provide non-critical (sub-sonic) flow during operations. Eductors may be located in soundproof enclosures to avoid excessive ambient noise levels. As air from the liquid storage tanks flows through the eductors, ambient air is drawn into the eductors and mixed with the air from the storage tanks. According to a preferred embodiment, the PEVS will provide about a twenty time gain in the effectiveness of the air that is stored on site because the eductors will draw about 20 times the volume of ambient air into the system as compared to the volume of air supplied by the liquid storage tanks.

During some emergencies, effective filtering of airborne contaminants cannot be achieved (e.g., during a chlorine release). Accordingly, during these events, dampers 27 are used to stop the flow of outside ambient air into the system and the system is placed in a recirculation mode.

The outlet of each of the eductors is connected to a second stage eductor 28 which is used for recirculation of ambient air within the room. The outlet of the eductors 28 is connected to optional filters 30 which may be, for example, carbon bed filters for removal of organic contaminants, iodine, and the like. The system may alternatively include $CO_2$ removal filters, zeolite filters, or high efficiency particulate filters. Other filter systems which may be useful in various applications will be apparent to those of skill in the art on review of this disclosure. Filters 30 may, alternatively, be placed in flow lines 26.

From the carbon bed filters air flows into the room to be ventilated. In preferred embodiments, the air pressure inside the room is maintained at a slightly positive pressure as compared to the surroundings (e.g., between about ⅛ and ¼ inch water gauge). For faster pressurization, stored air can be injected directly into the room via lines and valves 31. Additionally, lines and valves 31 may be used for providing compressed air to the facility auxilliary air services during emergencies.

The eductor systems 20a and 20b in the battery room 6 are designed primarily for dilution of hydrogen gas. Accordingly, the air from control valves 22 flows into two stage eductors 24a and 24b which both draw air from the ambient outside the room. Air from the eductors is vented directly into the battery room 6 without the need for the filters 30 since human support need not be provided in the room 6, and hydrogen dilution is the primary function of the system.

According to alternative embodiments, the heat exchangers in room 6 are located partially or entirely outside of the room in a region where additional cooling is needed. For example, the exchangers may be located in an electrical equipment room, the control room, used in a heating air for instrument air supply, or service air supply especially for use when the facility is in an emergency or special operating mode such as a special maintenance or production mode with temporary power outages, or the like. Thereby, flexibility is obtained and the need for cooling capacity may be readily balanced with the need for fresh air throughout the plant.

FIG. 2 illustrates an alternative valve arrangement for the heat exchangers 15. According to this embodiment, additional three-way valves 22c, 22d, and 22e are provided in the outlet of the heat exchangers. This embodiment provides better control and isolation of the various exchangers.

While the invention is illustrated above primarily with regard to a room ventilation system, the flow of the system could be adjusted to process exhaust gas from a contaminated room. In this alternative embodiment, suction to the system would be from the room and the air would pass from the eductor to a purification system and, thereafter, the outside air.

III. PEVS Operation

Under normal circumstances the control valves 22 remain closed and the tanks 8a and 8b are maintained at a pressure of between about 20 and 150 psig.

During an emergency event, the process supply valves, e.g., valves 22a or 14a, are opened. Liquid air then flows at a rate of, for example, between about 20 and 1000 SCFM equivalent from tank(s) 8 through valves 22a, through the eductor system 18a, and into the control room 4 and battery room 6. Liquid air is vaporized in heat exchangers 15 and flows through the eductors 24. The eductors draw air via ambient air supply lines 26 into the flow stream. The air stream is then filtered in carbon bed filters 30 to remove various contaminants. According to some embodiments, heat is provided to the tanks 8a at a rate of between about 50 watts and 1 kilowatt to provide vaporization of the air.

After about 1 to 10 hours, ice will develop on the operating heat exchangers of the system and it will be desirable to switch to the use of the heat exchanger 15b, permitting the various components associated with the heat exchanger 15a to return to about ambient temperature. Accordingly, the valves 22a are closed, and the valves 22b are opened. Accordingly, air then flows through eductor systems 18b and 20b into the rooms 4 and 6.

The system herein will provide not only clean air to desired location, but will also provide air cooling to the rooms. For example, between 10,000 and 100,000 BTU/hr of cooling may be provided.

The system herein may optionally be extended by addition of lines, valves and a liquid air gassifier heated by electrical or other power sources 40 shown on FIG. 3. In this optional configuration, the system still retains the same emergency function capabilities but also provides for clean compressed air for use as breathing air, instrument air or service air when the facility is in selected non-emergency operating modes such as special maintenance or operation with temporary equipment outages.

IV. Conclusion

The present invention provides a greatly improved method and apparatus for supplying emergency ventilation in industrial facilities. It is to be understood that the above description is intended to be illustrative and not restrictive. Many variations of the invention will become apparent to those of skill in the art upon review of this disclosure. Merely by way of example, the invention has been illustrated herein primarily with reference to its application in nuclear power plants such as S/ALWRs, but the invention is not so limited. For example, the invention could also be utilized to provide emergency ventilation in other types of nuclear plants such as modular gas-cooled reactors, production reactors, high-level hazardous (radioactive) process facilities, chemical plants, refineries, submerged vessels or structures, space vehicles or stations, or the like. The scope of the invention should, therefore, be determined not with reference to the above description, but instead should be determined with reference to the appended claims along with their full scope of equivalents.

What is claimed is:

1. Apparatus for providing emergency air to a selected room in an industrial facility comprising:
   a) an air storage tank, said air storage tank selected from the group of pressurized liquid air storage tanks and compressed air storage tanks;
   b) a flow line from said storage tank to a supply valve for permitting flow of air from said storage tank during an emergency event;
   c) a heat exchanger downstream of said supply valve, said heat exchanger adapted to heat air from said tank by way of heat transfer with air in said room; and
   d) an eductor in said flow line downstream of said heat exchanger, said eductor further connected to an ambient air supply line, said ambient air supply line terminating at an ambient air source outside of said room, said eductor discharging into said selected room.

2. Apparatus as recited in claim 1 wherein said air storage tank is a liquid air storage tank.

3. Apparatus as recited in claim 2 further comprising a heater in said liquid air storage tank, said heater having a variable energy input whereby a flow of air into said room can be controlled.

4. Apparatus as recited in claim 1 further comprising:
   a) a second air storage tank;
   b) a second supply flow line and control valve for regulating a flow of liquid from said second tank during an emergency event to a second heat exchanger; and
   c) a second eductor in said second flow line downstream of said second heat exchanger, said second eductor further connected to a second ambient air supply line, said second ambient air supply line terminating at an ambient air source outside of said room, said second eductor discharging into said selected room, said second control valve connected to alternately supply air to said selected room.

5. Apparatus as recited in claim 1 further comprising a purification filter attached to a discharge of said eductor.

6. Apparatus as recited in claim 5 wherein said purification filter is a carbon bed filter.

7. Apparatus as recited in claim 1 wherein said flow line is further connected to a second room to be ventilated, and further comprising:
   a) a second supply valve regulating a flow of liquid air into said second room to be ventilated; and
   b) a second heat exchanger and eductor downstream of said second control valve, said second eductor further connected to a second ambient air supply line and discharging into said second room.

8. Apparatus as recited in claim 7 further comprising a second stage eductor downstream of said eductor.

9. Apparatus as recited in claim 7 wherein said heat exchanger cools equipment in a location of said facility outside of said room, said equipment selected from the group consisting of an electric power supply, and an instrument air supply.

10. Apparatus as recited in claim 3 wherein said heater has a capacity of between about 100 watts and 1 kilowatt.

11. Apparatus as recited in claim 1 wherein said heat exhanger has at least about 100% excess heat transfer capacity above an amount needed for vaporization of liquid flowing therethrough.

12. Apparatus as recited in claim 1 wherein said air storage tank contains liquid air at a pressure of between about 20 and 150 psig.

13. Apparatus as recited in claim 1 wherein said tank contains liquid air at a pressure of about 50 psig.

14. Apparatus as recited in claim 1 further comprising a second eductor downstream of said eductor.

15. Apparatus as recited in claim 1 wherein said room is a control room.

16. Apparatus as recited in claim 1 wherein said room is a control room in a nuclear power plant.

17. Apparatus as recited in claim 1 further comprising a supply line and valve downstream of said heat exchanger, said supply line being connected to emergency services selected from the group consisting of breathing air supply, room pressurization supply, instrument air supply, service air supply.

18. Apparatus as recited in claim 7 wherein said second room is a battery room.

19. Apparatus as recited in claim 7 wherein said second room is a battery room in a nuclear power plant.

20. Apparatus as recited in claim 1 further comprising liquid air distribution systems by which stored air may be used to perform non-emergency functions in the facility selected from the group of breathing air supply, instrument air supply and service air supply.

21. A method of ventilating a control room in a nuclear power plant comprising the steps of:
   a) flowing liquid air from at least one of two storage tanks into said control room;
   b) selectively controlling flow in an alternating manner into first and second heat exchangers in said control room, said heat exchangers vaporizing said liquid air by way of heat exchange with air in said room;
   c) flowing said air from said control room through at least one eductor, said eductor drawing in ambient air from outside of said room; and
   d) flowing air from said eductor into said control room.

22. The method as recited in claim 21 further comprising the step of adjusting a heater input to said storage tanks so as to adjust a flow rate of air into said room.

23. Apparatus for venting air from a selected room in an industrial facility comprising:

a) an air storage tank, said air storage tank selected from the group of pressurized liquid air storage tanks and compressed air storage tanks;
b) a flow line from said storage tank to a supply valve for permitting flow of air from said storage tank during an emergency event;
c) a heat exchanger downstream of said supply valve, said heat exchanger adapted to heat air from said tank by way of heat transfer with air in said room; and
d) an educator in said flow line downstream of said heat exchanger, said educator further connected to an air inlet line for drawing air from said selected room, said educator discharging into a purification system, said purification system discharging to the environment.

* * * * *